United States Patent [19]

Grot

[11] 3,884,885

[45] May 20, 1975

[54] MELT PROCESSING OF FLUORINATED POLYMERS

[75] Inventor: Walther Gustav Grot, Chadds Ford, Pa.

[73] Assignee: E. I. du Pont de Nemours & Company, Wilmington, Del.

[22] Filed: Aug. 1, 1973

[21] Appl. No.: 384,502

[52] U.S. Cl. .................. 260/79.3 R; 260/79.3 MU
[51] Int. Cl. .................. C07c 143/68; C08f 15/02
[58] Field of Search.. 260/79.3 MU, 79.3 M, 79.3 R

[56] References Cited
UNITED STATES PATENTS

| | | | |
|---|---|---|---|
| 3,041,317 | 6/1962 | Gibbs et al. | 260/79.3 MU |
| 3,220,984 | 11/1965 | Tashlick | 260/79.3 MU |
| 3,236,881 | 2/1966 | Distler et al. | 260/79.3 MU |
| 3,282,875 | 11/1966 | Connolly et al. | 260/79.3 MU |
| 3,392,096 | 7/1968 | Lawton et al. | 260/79.3 M |
| 3,501,432 | 3/1970 | Wright et al. | 260/79.3 MU |
| 3,560,568 | 2/1971 | Resnick | 260/327 M |
| 3,632,685 | 1/1972 | Bourat | 260/79.3 R |
| 3,718,627 | 2/1973 | Grot | 260/79.3 MU |
| 3,784,399 | 1/1974 | Grot | 260/79.3 MU |

Primary Examiner—Ronald W. Griffin

[57] ABSTRACT

A fluorinated polymer which contains pendant groups in the form of $-SO_3H$, salt thereof, or salt of $-SO_2NH_2$ is converted to a polymer whose surface is melt processable. Conversion of the polymer is obtained by treatment with a tertiary amine, quaternary ammonium base, or the salt of the amine or base.

19 Claims, No Drawings

MELT PROCESSING OF FLUORINATED POLYMERS

BACKGROUND OF THE INVENTION

Fluorinated polymers with pendant chains containing groups such as sulfonamide and sulfonic acid are known in the art and possess utility as ion exchange resins. These resins are useful in electrolytic cells where it is necessary to have thermal and chemical stability such as for use as a membrane in an environment of an electrolytic chloralkali cell.

A serious limitation of many ion exchange membranes is that repair has not been possible in the event of a tear or perforation. In such occurrence the entire membrane is discarded since it is no longer useful in the electrolytic cell.

SUMMARY OF THE INVENTION

This invention is directed to the treatment of fluorinated polymers which contain pendant side chains in the form of $-SO_3H$, salt thereof, or salt of $-SO_2NH_2$. These polymers cannot be practically processed or fabricated by the application of heat.

The present invention renders at least the surface of the polymer meltable at relatively low temperatures by treatment of the fluorinated polymer with a tertiary amine or quaternary ammonium base, or the salt of the amine or base. The treatment chemically converts the groups of the polymer which allows melt processing or fabrication.

After processing or fabrication by the application of heat, the treated polymer may be reconverted to its original chemical form.

DETAILED DESCRIPTION OF THE INVENTION

Fluorinated polymers with terminal sulfonyl groups present in the form of $-SO_3H$, salt thereof, or salt of $-SO_2NH_2$ represents the starting polymer which is treated to allow melt processing.

As employed herein fluorinated polymer denotes a polymer with a backbone fluorocarbon chain which has sulfonyl groups attached either directly to a main fluorocarbon chain of the polymer or to the fluorocarbon side chains attached to the main chain, and where either the main chain or a side chain may contain either oxygen atoms.

As employed herein salt is employed in its normal definition. Salts of $-SO_2NH_2$ may be represented by $-SO_2NHX$, where X is illustratively alkali metal or alkaline earth metal. In similar fashion, salts of $-SO_3H$ may be represented by $-SO_3Y$, where Y is illustratively similarly defined as X as well as $NH_4$. While X may be $NH_4$, generally the salt is unstable and generally will not be employed.

As employed herein melt processing denotes the employment of the polymer at elevated temperature wherein the polymer melts or softens to a point where it possesses flow characteristics.

Actual melting to completely liquefy the polymer or portion thereof is not necessary. Illustratively, elevated pressure in conjunction with elevated temperature allows the polymer to be bonded to another surface and/or physically formed.

The fluorinated polymer which is melt processed may be present as a film since an important utility is as an ion exchange membrane in an electrolytic cell. However, it is within the scope of this disclosure to use melt processing for fluorinated polymers regardless of their physical form.

The polymers with the sulfonyl groups in the form of $-SO_3H$, salt thereof or salt of $-SO_2NH_2$ cannot be melt processed since there is degradation of the polymer at elevated temperature. These polymers are prepared from intermediate polymers which can be shaped and extruded at elevated temperature to form the polymer into the desired physical shape.

The intermediate polymers are prepared from monomers which are fluorine substituted vinyl compounds. The polymers are made from at least two monomers with at least one of the monomers coming from each of the two groups described below. The first group comprises fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof.

The second group is the sulfonyl containing monomers containing the precursor $-SO_2F$ or $-SO_2Cl$. One example of such a comonomer is $CF_2=CFSO_2F$. Additional examples can be represented by the generic formula $CF_2=CFR_fSO_2F$ wherein $R_f$ is a bifunctional perfluorinated radical comprising 2 to 8 carbon atoms. The particular chemical content or structure of the radical linking the sulfonyl group to the copolymer chain is not critical and may have fluorine, chlorine or hydrogen atoms attached to the carbon atom to which is attached the sulfonyl group. If the sulfonyl group is attached directly to the chain, the carbon in the chain to which it is attached must have a fluorine atom attached to it. The $R_f$ radical of the formula above can be either branched or unbranched, i.e., straight chained and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are

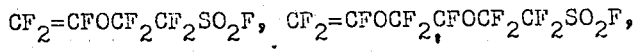
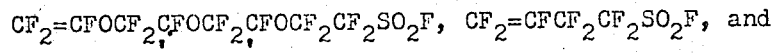
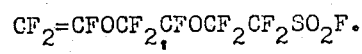

The most preferred sulfonyl fluoride containing comonomer is perfluoro(3,5-dioxa-4-methyl-7-octenesulfonyl fluoride),

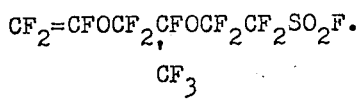

The sulfonyl containing monomers are disclosed in such references as U.S. Pat. No. 3,282,875 to Connolly et al. and U.S. Pat. No. 3,041,317 to Gibbs et al. and in U.S. Pat. No. 3,718,627 to Grot and in U.S. Pat. No. 3,560,568 to Resnick.

The preferred intermediate copolymers are perfluorocarbon although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably, 25 to 50 percent by weight of the latter.

The intermediate copolymer is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, issued to H. H. Gibbs and R. N. Griffin on June 26, 1962; that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0°–200°C. and at pressures in the range 1–200, or more, atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene, and the like.

Aqueous techniques for preparing the intermediate copolymer include contacting the monomers with an aqueous medium containing a free-radical initiator to obtain a slurry of polymer particles in non-water-wet or granular form, as disclosed in U.S. Pat. No. 2,393,967, issued to M. M. Brubaker on Feb. 5, 1946; contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752, issued to K. L. Berry on July 10, 1951, and U.S. Pat. No. 2,593,583 issued to J. F. Lontz on Apr. 22, 1952.

The intermediate polymers are fabricated into the desired physical form as a film by conventional techniques. Illustratively, the film may be prepared by pressing the fluorinated polymer at 250 to 40,000 psig or can be prepared by extrusion employing elevated temperatures. The films normally range in thickness from 0.002 to 0.02 inch.

The polymer which is directly employed as the ion exchange membrane requires conversion of the sulfonyl groups in the intermediate polymer which are in the form such as —SO$_2$F to —SO$_3$H, salt thereof, or salt of —SO$_2$NH$_2$. Suitable salts are in the form of —SO$_2$NHX where X is alkali metal or alkaline earth metal and —SO$_3$Y where Y is NH$_4$, alkali metal or alkaline earth metal. Illustrative examples of X and Y are sodium and potassium.

The conversion to the final polymer may be undertaken in accordance with the disclosure in U.S. Pat. No. 3,282,875 to Connolly et al.

Illustratively, conversion of the —SO$_2$F groups to —SO$_2$NH$_2$ may take place by contact with anhydrous ammonia which can be in the gaseous form, the liquid form, as a mixture with air or other gas which will not react with the sulfonyl group or the rest of the polymer, or ammonia in a solvent which is nonaqueous and which is nonreactive with the polymer. Conversion to the —SO$_2$NHX form where X is alkali metal or alkaline earth metal is undertaken by contacting the polymer with the hydroxide of the cation of the alkali metal or cation of the alkaline earth metal.

The fluorinated polymer film may be directly employed as a membrane for ion exchange with the sulfonyl groups present as —SO$_3$H, salt thereof, or salt of —SO$_2$NH$_2$.

While this membrane has proven to have extended life for ion exchange in an electrolytic chloralkali cell, the film may become damaged in use. For example, tears or perforations may develop in the film during handling or during clamping in the cell. In this event the entire membrane was previously discarded since it no longer could be employed in the cell. Treatment of the fluorinated polymer in accordance with this disclosure permits the polymer to become melt processable and allows repair and reuse of a damaged film.

The fluorinated polymer with the sulfonyl groups present as —SO$_3$H, salt thereof, or salt of —SO$_2$NH$_2$ is treated with a tertiary amine, quaternary ammonium base or the salt of the amine or base.

The type of tertiary amine or salt thereof employed is not critical although as a practical matter the amine or amine component of the salt will have a molecular weight below 500. Low molecular weight tertiary amines or salts may be used although superior results have been found with a molecular weight of the amine or amine component above 100. An optimum molecular weight is considered to be of the order of 120–150. Additionally, preferred tertiary amines and the salts thereof will have an ionization constant greater in aqueous solution than $10^{-6}$ and a decomposition temperature above 250°C.

Examples of suitable tertiary amines include alkyl amines such as trimethyl amine, triethyl amine, tributyl amine, tripentyl amine as well as aryl tertiary amines such as tributyl amine.

It has been found that when the sulfonyl group of the polymer is in the form of —SO$_3$Y with Y an alkali metal that the tertiary amine is too weak a base to effect the desired conversion of the polymer. However, the tertiary amine salt is suitable.

In similar fashion as the use of tertiary amine, the quaternary ammonium base or salt thereof employed for treatment of the fluorinated polymer will have a practical upper limit of 500 for the molecular weight based upon the quaternary ammonium ion. While higher molecular weights may be employed, diffusion into the polymer will become extremely slow. Additionally, the high molecular weight base or salt also will tend to modify the polymer and become a predominant constituent therein.

As with tertiary amines, low molecular weight quaternary ammonium bases and salts may be utilized. However, better results from the standpoint of melt processing occur at molecular weights above 100 and more preferably above 150 based upon the quaternary ammonium ion.

Examples of suitable quaternary ammonium bases are tetramethyl ammonium hydroxide, tetraethyl ammonium hydroxide, tetrapropyl ammonium hydroxide, tetrabutyl ammonium hydroxide, tetrapentyl ammonium hydroxide, benzyl trimethyl ammonium hydroxide and dodecylbenzyl trimethyl ammonium hydroxide.

The tertiary amines, quaternary ammonium base, and salts thereof are desirably employed with a solvent. Examples of suitable solvents are methanol and ethanol although any solvent may be utilized.

After treatment and conversion of the polymer, melt processing is undertaken. In the case of a membrane in the form of a film, the damaged area is converted in conformance with this disclosure. Additionally, a separate section of a film, illustratively of identical composition as the membrane, is pressed in contact with the damaged portion of the membrane. By application of heat, alone or in conjunction with pressure, bonding of the two surfaces takes place.

The temperature employed for the melt processing will be of the order of several hundred degrees Centigrade. The temperature of film will be dependent upon the fluorinated polymer used as well as the tertiary amine, quaternary ammonium base, or salt which converts the polymer. Additionally, the temperature employed in melt processing will be dependent on whether heat sealing is desired in contrast to complete melting of the polymer. Temperatures below 300°C. have proven useful.

The use of pressure in melt processing is optional. Pressure is desirable in instances where a lower processing temperature is desired. In the case of repair of a damaged membrane, pressure aids in providing a satisfactory bond between two separate portions of converted polymer film.

In many cases, particularly if the repaired area of membrane is small relative to the area of the film, the repaired membrane can be used without further treatment. However, if desired, the tertiary or quaternary ammonium ion which forms a portion of the polymer can be replaced by other cations by ion exchange techniques. Tertiary ammonium ions, including those formed by thermal decomposition of quaternary ammonium ions, are more readily displaced by strong bases such as the alkali metal hydroxides. In this case, if the molecular weight of the amine is higher than about 120, the use of a solvent such as methanol is advisable to prevent precipitation of the amine within the polymer phase.

With the use of the tertiary amine, quaternary ammonium base, or the salt of the amine or base, precipitation within the polymer may be tolerated in some instances upon conversion to the starting polymer. An example of such instance is after repair of a damaged membrane wherein the repaired area is small in comparison to the total membrane area. While the repaired area of membrane at a minimum may be less efficient in ion exchange than the surrounding membrane, nevertheless, the membrane may be employed in its intended environment.

While the present invention has been discussed in relationship to repair of tears or perforations in a film, it is within the scope of this disclosure to melt process all physical forms of fluorinated polymers wherein the sulfonyl group is present as previously defined.

Illustratively, waste or scrap material may be treated with the tertiary amine, quaternary base or salt thereof. Thereafter, by the application of heat the material may be formed in a single composite mass thereby converting the waste to a usable form. Conventional techniques such as extrusion may be employed in reforming the polymer.

EXAMPLES

To further illustrate the innovative aspects of this invention, the following Examples are provided:

EXAMPLE 1

A ten mil film of a copolymer of tetrafluoroethylene and

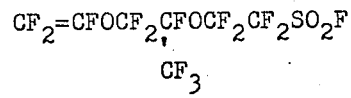

(mole ratio 7.5:1) was prepared. The sulfonyl groups of the polymer in the $-SO_2F$ form were converted to the $-SO_3K$ form by treatment at 95°C. for one hour with a solution (by weight) of 15 percent potassium hydroxide, 30 percent DMSO, and 55 percent water.

Two pieces of 10 mil polymer were immersed overnight in 0.1 molar solution of tetrabutylammonium hydroxide and 0.1 molar tetrabutylammonium chloride in methanol; the excess solution being wiped off and the samples permitted to air dry. The two pieces were then placed on top of each other and pressed for 3 minutes in a hydraulic press at 230°C. and 5 tons force on an area of 30 square inches. A good bond was obtained that withstood boiling in water.

EXAMPLE 2

The procedure of Example 1 was repeated in all essential respects except a solution of tetramethylammonium hydroxide was used. No bond was formed at a temperature of 245°C. and 5 tons force. However, heat sealing did take place when the temperature was raised to 280°C.

EXAMPLES 3 to 7

In similar fashion as the procedure of Examples 1 and 2, triethyl amine, tribenzyl amine, benzyl trimethyl ammonium hydroxide and dodecylbenzyl trimethyl ammonium hydroxide were separately employed with heat sealing taking place at 240°C.

Although the invention has been described by way of specific embodiments, it is not intended to be limited thereto. As will be apparent to those skilled in the art, numerous embodiments can be made without departing from the spirit of the invention or the scope of the following claims.

What is claimed is:

1. A method for treating a fluorinated polymer which degrades prior to melting, said polymer containing pendant side chains with sulfonyl groups which are attached to carbon atoms which have at least one fluorine atom attached thereto, said sulfonyl groups in the form of —$SO_3H$, salt thereof, or salt of —$SO_2NH_2$, which method comprises contacting said polymer with a tertiary amine, quaternary ammonium base or the salt of said amine or base with the proviso that when said pendant side chain is in the form —$SO_3Y$ with Y an alkali metal, the salt of the tertiary amine, the quaternary ammonium base or salt thereof is employed; and melt processing the contacted polymer.

2. The method of claim 1 wherein the tertiary amine, the amine component of the salt, or quaternary ammonium ion has a molecular weight below 500.

3. The method of claim 2 wherein said molecular weight is above 100.

4. The method of claim 2 wherein said tertiary amine or the salt thereof has an ionization constant greater than $10^{-6}$ in aqueous solution.

5. The method of claim 2 wherein said tertiary amine or the salt thereof has a decomposition temperature above 250°C.

6. The method of claim 5 wherein said tertiary amine or the salt thereof has an ionization constant greater than $10^{-6}$ in aqueous solution.

7. The method of claim 2 wherein the pendant side chain is in the form of the salt of —$SO_2NH_2$.

8. The method of claim 2 wherein the pendant side chain is in the form of —$SO_3H$ or salt thereof.

9. The method of claim 8 wherein the pendant side chain is in the form of —$SO_3Y$ with Y an alkali metal or alkaline earth metal.

10. The method of claim 9 wherein Y is an alkali metal.

11. The method of claim 10 wherein Y is sodium.

12. The method of claim 10 wherein Y is potassium.

13. The method of claim 2 wherein said melt processing is at a temperature below 300°C.

14. The method of claim 2 wherein said melt processing comprises joining two sections of contacted polymer.

15. The method of claim 2 wherein said melt processing comprises extruding the contacted polymer.

16. The method of claim 2 wherein the contacted polymer after melt processing is converted to a fluorinated polymer which degrades prior to melting.

17. The method of claim 16 wherein said conversion is by ion exchange.

18. The method of claim 2 wherein a solvent is employed for the tertiary amine, quaternary ammonium base or the salt of said amine or base.

19. The method of claim 2 wherein a quaternary ammonium base or salt thereof is employed.

* * * * *